(12) United States Patent
Roussie et al.

(10) Patent No.: US 8,220,842 B2
(45) Date of Patent: Jul. 17, 2012

(54) THREADED TUBULAR CONNECTION WHICH IS RESISTANT TO BENDING STRESSES

(75) Inventors: Gabriel Roussie, Cappelle en Pevele (FR); Jacky Massaglia, Saint-Saulve (FR); Scott Granger, Valenciennes (FR); Olivier Caron, Valenciennes (FR); Eric Verger, Gommegnies (FR); Francois Conrad, Saint Saulve (FR)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 366 days.

(21) Appl. No.: 12/650,143

(22) Filed: Dec. 30, 2009

(65) Prior Publication Data
US 2010/0171305 A1    Jul. 8, 2010

Related U.S. Application Data

(63) Continuation-in-part of application No. 10/594,112, filed as application No. PCT/EP2005/003086 on Mar. 22, 2005, now Pat. No. 7,661,727, which is a continuation-in-part of application No. 10/558,410, filed as application No. PCT/EP2004/005139 on May 13, 2004, now Pat. No. 7,661,728.

(30) Foreign Application Priority Data

May 30, 2003   (FR) ...................................... 03 06599
Mar. 26, 2004  (FR) ...................................... 04 03147

(51) Int. Cl.
*F16L 25/00*   (2006.01)
(52) U.S. Cl. ....................................... 285/333; 285/334

(58) Field of Classification Search .................. 285/333, 285/334
See application file for complete search history.

(56) References Cited

U.S. PATENT DOCUMENTS

| 1,927,656 A | 9/1933 | Eaton et al. | |
| 1,942,518 A * | 1/1934 | Protin | ........................... 285/333 |

(Continued)

FOREIGN PATENT DOCUMENTS

EP    1 302 623    4/2003

(Continued)

OTHER PUBLICATIONS

U.S. Appl. No. 12/914,044, filed Oct. 28, 2010, Roussie.

(Continued)

*Primary Examiner* — David E Bochna
(74) *Attorney, Agent, or Firm* — Oblon, Spivak, McClelland, Maier & Neustadt, L.L.P.

(57) ABSTRACT

A threaded tubular connection is provided. The connection includes a male tubular element provided with a male threaded portion and a female tubular element provided with a female threaded portion. The male threaded portion and the female threaded portion each include self-locking threads having a crest, a load flank, a stabbing flank and a root, a load flank lead of the self-locking threads being larger than a stabbing flank lead of the self-locking threads such that in a tightened position of the threaded tubular connection, the load flanks and the stabbing flanks of the male self-locking threads are engaged in tight contact with the load flanks and the stabbing flanks of the female self-locking threads. A transfer zone is axially disposed between the threaded portions and a free end of at least one of the tubular elements, while being axially spaced from the threaded portions.

37 Claims, 6 Drawing Sheets

U.S. PATENT DOCUMENTS

| | | | |
|---|---|---|---|
| 2,992,019 A | 7/1961 | Macarthur | |
| 2,992,613 A * | 7/1961 | Bodine | 285/333 |
| 3,224,799 A * | 12/1965 | Blose et al. | 285/334 |
| 3,870,351 A | 3/1975 | Matsuki | |
| 3,989,284 A | 11/1976 | Blose | |
| 4,153,283 A | 5/1979 | Hellmund et al. | |
| RE30,647 E | 6/1981 | Blose | |
| 4,384,737 A | 5/1983 | Reusser | |
| 4,611,838 A | 9/1986 | Heilmann et al. | |
| 4,730,857 A | 3/1988 | Schwind | |
| 4,736,967 A | 4/1988 | Mott et al. | |
| 4,770,444 A | 9/1988 | Hauk | |
| 4,796,923 A * | 1/1989 | Liggins et al. | 285/334 |
| 4,915,426 A * | 4/1990 | Skipper | 285/355 |
| 4,946,201 A * | 8/1990 | Tai | 285/334 |
| RE34,467 E | 12/1993 | Reeves | |
| 5,964,486 A * | 10/1999 | Sinclair | 285/334 |
| 6,056,324 A * | 5/2000 | Reimert et al. | 285/334 |
| 6,481,760 B1 | 11/2002 | Noel et al. | |
| 6,494,499 B1 * | 12/2002 | Galle et al. | 285/334 |
| 6,511,102 B2 * | 1/2003 | Krug et al. | 285/333 |
| 6,543,816 B1 | 4/2003 | Noel | |
| 6,659,509 B2 | 12/2003 | Goto et al. | |
| 6,752,436 B1 * | 6/2004 | Verdillon | 285/333 |
| 6,905,149 B2 | 6/2005 | DeLange et al. | |
| 6,957,834 B2 * | 10/2005 | Maeda | 285/333 |
| 6,971,681 B2 | 12/2005 | Dell'Erba et al. | |
| 7,334,821 B2 * | 2/2008 | Dutilleul et al. | 285/333 |
| 7,506,900 B2 * | 3/2009 | Carcagno et al. | 285/333 |
| 2002/0017788 A1 * | 2/2002 | Krug et al. | 285/333 |
| 2002/0027363 A1 | 3/2002 | Mallis et al. | |
| 2003/0067169 A1 | 4/2003 | Church | |

FOREIGN PATENT DOCUMENTS

| | | |
|---|---|---|
| JP | 07063289 | 3/1995 |
| JP | 2003-42354 | 2/2003 |
| WO | 2004/060590 | 7/2004 |

OTHER PUBLICATIONS

U.S. Appl. No. 13/139,188, filed Jun. 10, 2011, Verger, et al.
U.S. Appl. No. 13/319,410, filed Nov. 8, 2011, Granger, et al.
U.S. Appl. No. 13/319,130, filed Nov. 17, 2011, Granger, et al.
U.S. Appl. No. 13/260,138, filed Sep. 23, 2011, Granger, et al.

* cited by examiner

THREADED TUBULAR CONNECTION WHICH IS RESISTANT TO BENDING STRESSES

CROSS-REFERENCE TO RELATED APPLICATIONS

The present application is a continuation-in-part of U.S. application Ser. No. 10/594,112 and of U.S. application Ser. No. 10/558,410. U.S. application Ser. No. 10/594,112 was filed on Sep. 25, 2006, now U.S. Pat. No. 7,661,727 and is a national stage application of PCT Application No. PCT/EP05/003086, filed Mar. 22, 2005, which claims priority to French Application No. 0403147, filed Mar. 26, 2004. U.S. application Ser. No. 10/558,410 was filed on Nov. 28, 2005, now U.S. Pat. No. 7,661,728 and is a national stage application of PCT Application No. PCT/EP04/05139, filed May 13, 2004, which claims priority to French Application No. 0306599, filed May 30, 2003. The entire contents of each of these applications are incorporated by reference.

BACKGROUND OF THE INVENTION

1. Field of the Invention

The invention relates to a threaded tubular connection for a tubular string which is subjected to dynamic bending loads, comprising a male tubular element provided with a male threaded portion and a female tubular element provided with a female threaded portion.

2. Discussion of the Background

That type of threaded connection is intended for making strings for hydrocarbon or the like wells.

In addition to relatively constant (static) axial tensile loads, under the action of waves, the wind, the tides and sea currents, strings connecting an offshore platform to the sea bed are subjected to variable (dynamic) bending loads. Said loads are transmitted from one tube to the next in the string through the threaded connections.

Drill string components for rotary drilling, in particular drill pipe, heavy weight drill pipe and drill collars, are also subjected to variable bending loads due to rotation of the string when drilling a non-vertical (deviated) borehole and the threaded connections between such components also have to bear and transmit such variable bending loads.

Figure 3:
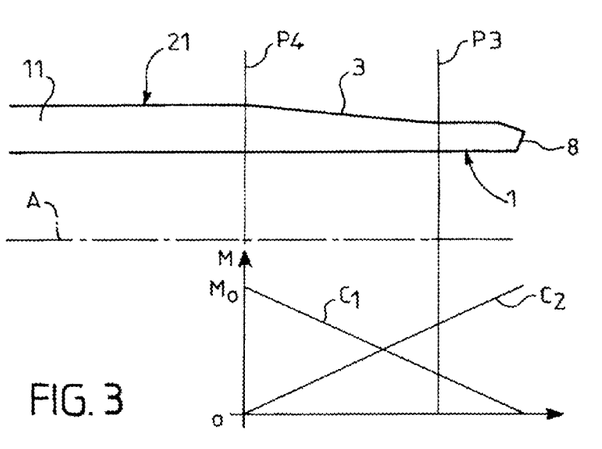
FIG. 3 is an explanatory diagram illustrating the distribution of bending moments along the male element and the female element for a prior art threaded connection.

FIG. 3 shows that the last threads of the male element and the female element are subjected to a maximum bending moment which has to be transmitted in addition to the whole of the axial tensile load.

This results in dynamic tensile loads known as repeated loads at the root of the last threads, and more particularly the last male threads, which initiates fatigue cracking at that location leading to catastrophic rupture of the string.

International patent applications WO-A-01/75345 and WO-A-01/75346 describe solutions for reducing stresses at the roots of said threads, but the resulting improvement may prove insufficient.

Said dynamic loads also cause friction between the parts of the male and female elements in contact, leading to cracking due to fretting fatigue.

When one of the tubular elements has an axial abutment (or axial stop) surface at its free end which abuts against the other tubular element, the abutment that occurs enables to absorb part of the bending moment. However; to form such abutment surfaces, it is necessary to choose thicker tubes or to increase their thickness locally by upsetting, which introduces increased costs.

In the case of threaded tubular connections having so-called wedge or self-locking threads such as disclosed in documents U.S. RE30647, U.S. RE34467, WO2004/106797, the content of which documents is incorporated here by reference, there is no such abutment surface because the pin and box thread stabbing flanks come in contact and the pin and box thread load flanks come in contact during make-up and stop further threading of the connection, fulfilling then the function of abutment surfaces. Separate abutment surfaces are not only unnecessary on such threads, in addition they are undesired as it is difficult to synchronize end of make-up by abutment surfaces and by self-locking threads.

SUMMARY OF THE INVENTION

The aim of the invention is to overcome these disadvantages thanks to an appropriate distribution of bending loads and optionally of tensile loads.

The invention also aims to provide spaces to house lubricating grease and the debris resulting from wear of the surfaces in contact.

A further aim is to provide sealing surfaces between the threaded portions and the outside of the threaded connection which do not constitute a source of cracking due to fretting fatigue.

A final aim is to provide multiple sealing surfaces which enable to maintain a seal in the event of deterioration of certain thereof.

In particular, the invention provides a threaded connection of the type defined in the introduction. The male threaded portion and the female threaded portion comprise self-locking threads having a crest, a load flank, a stabbing flank and a root, a load flank lead of the self-locking threads being larger than a stabbing flank lead of the self-locking threads such that in a tightened position of the threaded tubular connection, the load and stabbing flanks of the male self-locking threads are engaged in tight contact with the load and stabbing flanks of the female self-locking threads. The threaded connection comprise a transfer zone axially disposed between said threaded portions and the free end of at least one of said tubular elements, it being axially spaced from said threaded portions in order to transfer a fraction of at least 20%, preferably at least 30% of the bending moment to which the connection is subjected from one element to the other. The male and female elements have respective transfer surfaces in mutual contact with a radial interference fit in said transfer zone, at least one of the transfer surfaces being an undulated surface defining a series of annular rounded ribs which come into interfering contact with the facing transfer surface, the maximum diameter point and the minimum diameter point of the undulation profile being located on respective rounded portions of the profile. The free end of each tubular element has a front surface which is free of contact with the other tubular element.

The axial width of the threads of said threadings and the interval between said threads may vary progressively along the axis of the connection over at least a portion of the axial length of the threadings, such that the threads of each threading are housed with an axial clearance in the intervals of the other threading at the start of make up, said clearance progressively decreasing until it becomes zero during make up.

Optional characteristics of the invention, which may be complementary or be by substitution, are given below:

the axial length of the transfer zone is selected so as to limit the contact pressure resulting from transferring the bending moment to a fraction of the yield strength of the material to less than 1 and preferably less than 0.5;

said male and female transfer surfaces are lubricated;
said facing transfer surface is a smooth surface;
said undulated surface is not in contact with said smooth surface between said ribs;
said two transfer surfaces are undulated surfaces;
the ribs of one transfer surface are housed between the ribs of the facing transfer surface;
said undulated surface or surfaces has/have a periodic profile;
said periodic profile is asymmetric;
said profile forms part of the male transfer surface and is defined by a first convex rounded portion containing a point with a maximum profile diameter, by a second concave rounded portion containing a point with a minimum profile diameter and which is tangential to the first rounded portion, and by a third convex rounded portion which is tangential to the first and second rounded portions and which has a radius which is substantially larger thereof;
the second rounded portion has a larger radius than the first rounded portion;
starting from the free end of the male element, the axial distance between a maximum profile diameter point and the following minimum diameter
point of the profile is less than the axial distance between a minimum pro-file diameter point and the following maximum diameter point of the pro-file;
the third profile is located between a minimum profile diameter point and the following maximum diameter point of the profile;
the radii of said rounded portions containing the points of maximum pro-file diameter and of minimum profile diameter are at least equal to 0.4 mm;
the axial distance between 2 consecutive points of maximum profile diameter is at least equal to 1 mm and the axial distance between 2 consecutive points of minimum profile diameter is at least equal to 1 mm.
said radial interference fit is substantially constant from one rib to the other;
said radial interference fit is about 0.4 mm in diameter for a nominal threaded element diameter of 177.8 mm;
said transfer surfaces are in mutual metal/metal sealing contact;
a sealing material in the form of a coating or of an added ring is interposed between the metal surfaces of the male and female elements in the transfer zone;
the male and female transfer surfaces or their envelopes form part of tapered surfaces;
the transfer surfaces or their envelopes are inclined with respect to the connection axis by an angle comprised between 0.5 and 5°;
said undulated surface has a roughness Ra≦3.2 micrometers;
said transfer zone is axially disposed between said threaded portions and the free end of the female element;
said undulated surface and said smooth surface form part of the male and female elements respectively;
the outer peripheral surface of the female element has a depression which locally reduces its external diameter facing the transfer zone;
said depression has an axially extending concave curvilinear profile facing the transfer zone and either side thereof, said external diameter being minimal substantially facing a median point of the transfer zone and increasing progressively to either side of said point;
said minimum external diameter is such that the bending inertia of the female element in the plane of said minimum diameter is at least equal to the product of the bending inertia $I_{zz}$ of the regular portion of a pipe at one end of which the male tubular element is formed and the fraction f of the bending moment to be transferred to the female element;
said transfer zone is axially disposed between said threaded portions and the free end of the male element;
said undulated surface and said smooth surface form part of the female and male elements respectively;
the inner peripheral surface of the male element has a depression which locally increases its internal diameter facing the transfer zone;
said depression has an axially extending concave curvilinear profile facing the transfer zone and either side thereof, said internal diameter being maximal substantially facing a median point of the transfer zone and decreasing progressively to either side of said point;
said maximum internal diameter is such that the bending inertia of the female element in the plane of said maximum diameter is at least equal to the product of the bending inertia $I_{zz}$ of the regular portion of a pipe at one end of which the female tubular element is formed and the fraction f of the bending moment to be transferred to the male element;
said curvilinear concave profile is connected to a chamfer adjacent to the free end of the female or male element;
said concave curvilinear profile has a radius of curvature of at least 50 mm and preferably at least 100 mm;
the connection comprises a transfer zone axially disposed between said threaded portions and the free end of the female element and a transfer zone axially disposed between said threaded portions and the free end of the male element;
the axial width of the threads of said threadings and/or the intervals between said threads varies progressively over the whole of the axial length of said threadings;
the axial width of the threads of said threadings and/or the intervals between said threads varies progressively over the whole of the axial length of each of said threading portions;
said undulated surface and said smooth surface form part of the female and male elements respectively;
said undulated surface and said smooth surface form part of the male and female elements respectively;
said threadings are tapered;
said threads have a dovetail profile;
the crests and roots of said threads are parallel to the axis of the threaded connection;
for the male threading and/or the female threading, the loading flank joins the crest and/or the root of the thread via a rounded portion the pro-file of which is substantially formed by two arcs of circles tangential to each other, the arc adjacent to the loading flank having a smaller radius of curvature than the other arc;
the radius of the arc adjacent to the loading flank is in the range 0.1 to 0.2 mm.
the radius of said other arc is in the range 0.8 to 1.2 mm;
the male and female threadings are non interfering at the thread roots and crests over all or a portion of the threadings;
the male and female threadings are interfering at the thread roots and crests over all or a portion of threadings;
the male and female threadings are interfering at the thread roots of a first threading and at the thread crests of a second threading over all or a portion of the threading length whereas there is a radial clearance between the thread roots of the second threading and the thread crests of the first threading;

said radial clearance is at least 0.05 mm;

the male and female elements are part of two made-up drill string components.

The invention also provides a process to improve the resistance to fatigue of a threaded tubular connection subjected to dynamic bending loads, said connection comprising a male tubular element with a male threaded portion and a female tubular element with a female threaded portion, wherein the connection comprises at least a transfer zone axially located between said threaded portions and the free end of one of said tubular elements while being axially spaced from said threaded portions so as to transfer from one element to the other element a fraction at least equal to 20% of the bending moment undergone by the connection, the male and female elements having in said transfer zone respective transfer surfaces which are in mutual contact and interfere radially, one at least of the transfer surfaces comprising means suited for spacing radially the contact locations from the section where the stresses applied to the connection run, in particular in the form of a series of rounded annular ribs. The free end of each tubular element is axially distal from a facing surface of the other tubular element. The male threaded portion and the female threaded portion comprise self-locking threads.

BRIEF DESCRIPTION OF THE DRAWINGS

The characteristics and advantages of the invention will now be described in more detail in the following description, made with reference to the accompanying drawings.

DETAILED DESCRIPTION OF THE PREFERRED EMBODIMENTS

Figure 1:
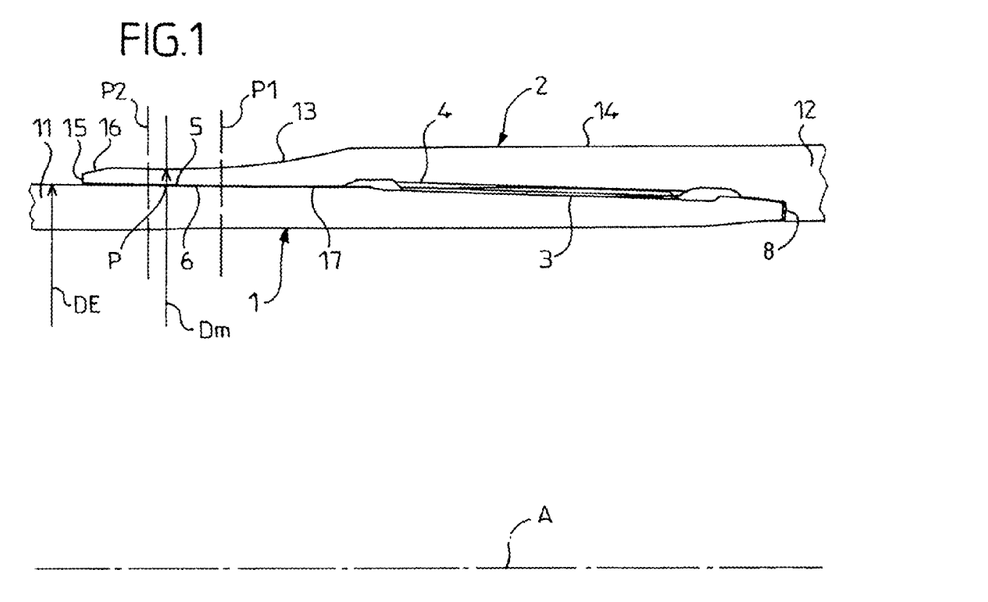
FIG. 1 is an axial half-sectional view of a threaded tubular connection of the invention.

The threaded tubular connection shown in FIG. 1 comprises a male tubular element 1 and a female tubular element 2 provided with respective tapered threaded portions 3, 4 which cooperate for mutual make up of the two elements. The element 1 is formed at one end of a great length tube 11 and element 2 is formed at one end of a tubular coupling 12 for connecting two tubes similar to 11. A plurality of tubes similar to 11 each one of which has two threaded elements similar to 1 at its ends can then be connected together through couplings similar to 12 each one of which has two threaded elements similar to 2 at its ends to form a string of tubes for an oil well, for example.

In the example shown, tube 11 has between its two male elements i.e. over the major portion of its length, termed the regular portion, a uniform external diameter ED of 177.8 mm (7 inches) which represents the nominal diameter of the threaded connection. The values for the dimensions given below take this nominal diameter into account and can vary therefrom.

According to the invention, the threaded tubular connection has a transfer zone which is axially defined by transverse planes P1 and P2, in which the male and female elements are in mutual contact through respective annular transfer surfaces 5, 6 of revolution around the axis A of the threaded portions; they have well defined profiles.

Figure 2:
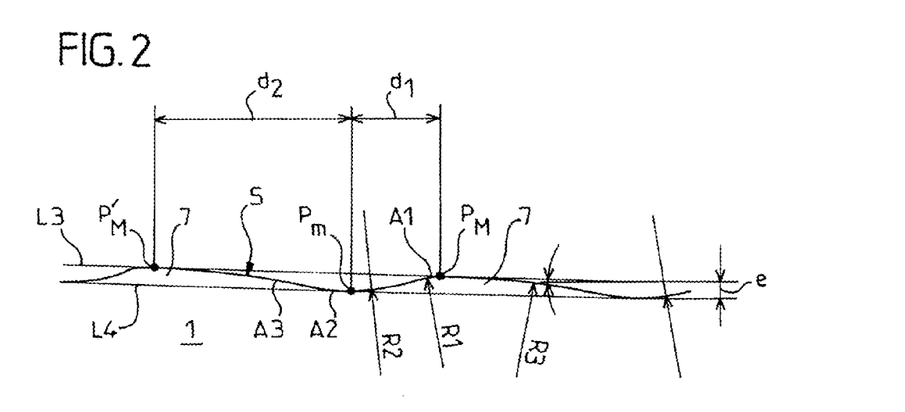
FIG. 2 is a partial axial sectional view on a larger scale of the male element of the threaded connection of FIG. 1, showing a portion of the male transfer surface.

The profile of surface 5 is shown in FIG. 2. The profile is an undulated periodic profile defined by repetition of a motif formed by three mutually tangential circular arcs, namely a first arc A1 which is outwardly convex, i.e. the concavity of which is turned towards the axis A, passing through a point $P_M$ with a maximum profile diameter, a second concave arc A2 (the concavity of which is turned radially outwardly) passing through a point Pm with a minimum profile diameter, and a third convex arc A3, the radii of said three arcs being respectively 0.8, 1.6 and 8 mm in the example shown. The profile of surface 5 is also asymmetric, the axial distance $d_1$ between a point PM with a maximum profile diameter and the following minimum diameter point Pm, starting from the free end 7 of the male element, i.e. from the right in FIG. 2, being less than the axial distance $d_2$ between the point Pm and the following maximum diameter point $P'_M$ of the profile. The distances $d_1$ and $d_2$ in this case are about 1 mm and 2 mm respectively.

The profile of surface 5 is generally inclined with respect to axis A, the straight lines L3 and L4 being respectively tangential to the set of arcs A1 and to the set of arcs A2, and thus constituting the outer and inner envelopes of said profile, being inclined at 2° with respect to said axis, growing closer thereto in the direction of the free end of the male element. Because of said inclination, the terms "maximum diameter point" and "minimum diameter point" refer to maximum and minimum diameters which are relative rather than absolute. The amplitude of the undulations in surface 5, i.e. the radial distance e between lines L3 and L4, is 0.2 mm.

The surface 6 of the female element facing surface 5, not shown in detail, is a tapered smooth surface the slope of which is equal to that of lines L3 and L4, so that the peaks of the different annular ribs 7 defined by surface 5 come into simultaneous contact with surface 6 when screwing the male threaded portion 3 into the female threaded portion 4. Advantageously, the dimensions of surfaces 5 and 6 are such that radial interference occurs at the end of screwing between the peaks of the ribs and the surface 6, said radial interference fit, i.e. the difference in diameter between the male and female elements measured prior to coupling at points which will come into interfering contact after make up, being uniform from one rib to the other and advantageously being 0.4 mm.

Because of the undulated profile of surface 5, the contact surfaces between the crests of the ribs 7 and the surface 5 are radially spaced from the section defined between the cone the generatrix of which is L4 (internal envelope of the ribs) and the opposed peripheral surface (internal) of the male element 1 where the stresses applied to the connection are fully exerted (i.e. where they run), improving thus the resistance to fatigue of said connection when it is subjected to dynamic bending loads.

Too small an axial distance $d_1+d_2$ (corresponding to the pitch of the ribs), for example smaller than 0.5 mm does not easily enable to form a sufficient undulation amplitude for the rounded portions under consideration. For that reason it is preferable to have an axial distance $d_1+d_2$ over 1 mm. Nevertheless too large an axial distance $d_1+d_2$ does not allow to house several ribs in the transfer zone unless said transfer zone is extended in an excessive way which is not cheaply produced.

Too small an inclination (lower than) 0.5° of the lines L3, L4 makes difficult the sliding of the surfaces 5, 6 one against each other during make up of elements 1, 2 in particular because of the desired interference between the surfaces. An inclination above or equal to 1° is even preferable. An inclination above 5° is not desirable because. it reduces too much the critical section of the male element 1 (minimum section of the element on which the whole of the axial loads are exerted on the connection) with respect to the section of the regular portion of the tube 11 and in consequence the efficiency of the connection.

Too low an undulation amplitude, for example lower than 0.5 mm does not allow to distance the section contacts where the axial stresses are exerted neither does it allow to store the wear debris as will be seen further on.

Too big an undulation amplitude reduces the critical section with the drawbacks mentioned above.

Moreover because of the undulated profile there remains between surfaces 5 and 6, between two consecutive ribs 7 annular spaces which can receive lubricating grease and/or debris formed by wear of the threaded elements during dynamic loadings. Further, each rib 7 defines an annular sealing contact surface with the surface 6, the multiplicity of said sealing surfaces reducing the risk of loss of a seal between the threaded portion zone 3, 4 and the outside of the threaded connection. This seal can be produced by direct contact of the constituent metallic materials of the male and female elements. In a variation, a sealing material such as an elastomer or a softer metal than that of the male and female elements (for example copper' on steel) may be interposed between the substrate materials in the form of a coating or of an added ring. A further possibility consists of subjecting one and/or other of the contact surfaces to a surface treatment which encourages a seal.

Too small a radial interference between the crests of the ribs and surface 6 does not allow a seal between surfaces 5 and 6. Too large a radial interference risks inducing galling between surfaces 5 and 6 during make up, which galling is detrimental to the behavior to fatigue of the connection and to the seal between surfaces 5 and 6.

In order to obtain a good seal between surfaces 5 and 6, it is preferable to master the roughness of said surfaces. A roughness Ra>3.2 micrometers is not desirable. For instance one can choose a roughness Ra≦1.6 micrometers.

Figure 4:
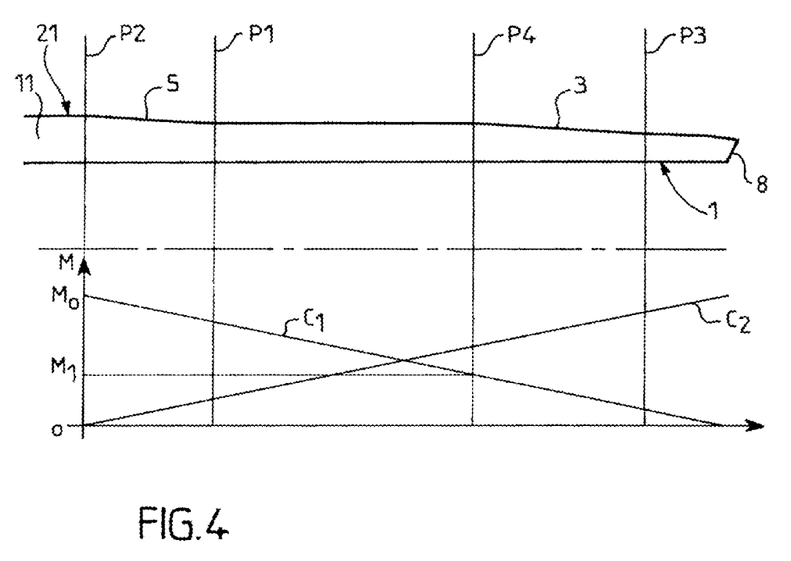
FIG. 4 is an explanatory diagram illustrating the distribution of bending moments along the male element and the female element for a threaded connection of the invention respectively.

The advantages of the invention are particularly well illustrated in FIGS. 3 and 4, the top part of each of which shows a half-sectional view of the male element of a threaded tubular connection and the lower portion of which shows curves representing the variation along the axis A of the connection of the bending moments experienced by the male and female elements.

In FIG. 3, which pertains to the prior art, male threaded portion 3 extends from a transverse plane P3 close to the free end 8 of the male element 1 to a transverse plane P4 which is directly followed by the regular portion 21 of the tube 11 to which the male element 1 belongs. When a bending load is applied to the tubular connection of which element 1 forms a part, this latter experiences a bending moment which varies along the axis A, following the curve C1, shown as a straight line. This moment M has a maximum value Mo in the plane P4. Conversely, the bending moment experienced by the female element, not shown, varies as the curve C2, shown as a straight line, that moment being zero in the plane P4 and increasing progressively in the direction of the free end 8.

In FIG. 4, which pertains to the invention, the bending moment M experienced by the male element 1 takes a maximum value Mo in the plane P2 which separates the transfer surface 5 and the regular portion 21 of the tube 11. The bending moment experienced by the threaded portion 3 has a maximum value $M_1$ in the plane P4 which defines the threaded portion 3 opposite the free end 8 of the male element. The further the transfer zone 5, 6 is spaced from threaded portions 3, 4, and as a result from plane P2 and plane P4, the lower the value $M_1$ with respect to the value Mo.

In the case shown in FIG. 4, the maximum diameter of the transfer surface 5 is equal to the diameter of the regular portion 21 of the tube 11.

The example below illustrates the manner by which the axial position of the transfer zone can be determined to obtain the effects sought by the invention.

We shall calculate the distance d between the centre of the transfer zone and the centre of the threaded portions to transfer a fraction f=0.5 of the bending moment experienced by the connection from one element to the other. This distance is given by equation (I), in which F represents the force on the transfer zone resulting from the bending moment and $M_{max}$ represents the maximum value of the bending moment which can be applied without permanent deformation of the connection:

$$d = \frac{f \mid M_{max}}{F} \quad (1)$$

The value $_{Mmax}$ is given by equation (2) (the formula for the strength of a material) in which YS represents the yield strength of the material of the connection, $I_{zz}$ represents the inertia of the cross section of the connection and OD represents the external diameter of the regular portion 21 of the tube 11:

$$M_{max} = \frac{YS \mid I_{ZZ}}{\frac{OD}{2}} \quad (2)$$

$I_{zz}$ is provided by equation (3), in which ID represents the internal diameter of the threaded connection:

$$I_{ZZ} = \left(\frac{\pi}{64}\right) \cdot (OD^4 - ID^4) \quad (3)$$

F equals the product of an area S of the transfer zone and the maximum pressure stress to be applied to this zone, which equals the yield strength YS multiplied by a fraction f which must not be exceeded.

S is the projection in an axial plane of the surface area in contact in the transfer zone, and is given by equation (4) in the case of a tapered transfer zone in which $D_1$ is the diameter of the cylindrical surface 17 (FIG. 1) of the female element 2 connecting the threaded portion 4 and the transfer surface area 6, and a is the apex 'half-angle of the tapered surface containing the transfer surfaces 5, 6 and/or their envelopes:

$$S = \frac{(OD + D_1)(OD - D_1)}{4|tg_\alpha} \quad (4)$$

Starting from the following data:

| | |
|---|---|
| OD = | 177.8 mm |
| ID = | 157.08 mm |
| $D_1$ = | 175.95 mm |
| YS = | 551 MPa |
| f = | 0.5 |
| f' = | 0.3 |
| a = | 2° | the following values can be calculated:

| | |
|---|---|
| $M_{max}$ | $119 \times 10^6$ N·mm |
| S | 4685 mm² |
| D | 76.8 mm |

In the example shown in FIG. 1, this distance represents substantially 150% of the axial length of the female threaded portion, which is 51 mm, the axial length of the transfer zone being 13.2 mm.

More particularly but not exclusively in the case shown in FIG. 1 in which the female element forms part of a coupling, the invention also encompasses reducing the thickness of said element, in the region facing the contact surfaces 5 and 6, to increase its flexibility. To this end, a depression 13 is formed on the outer peripheral surface 14 of the coupling, said depression having the profile of a large radius concave circular arc (more than 50 mm), in this case equal to 150 mm. This depression defines a minimum external diameter Dm facing a median point P of the transfer zone 5, 6, the external diameter increasing progressively either side of said point. Opposite the free end 15 of the element 2, the depression 13 connects to the cylindrical portion, with a maximum diameter, of the external surface 14. On the free end 15 side, the depression 13 connects to a chamfer 16 adjacent to the end 15. Advantageously, the minimum diameter of said chamfer, i.e. the diameter of element 2 at the junction between the chamfer 16 and the end face 15, is substantially equal to the diameter Dm of the bottom of the depression.

The diameter Dm is also selected so as not to have the bending inertia of the female element in the corresponding plane less than the product of the bending inertia $I_{zz}$ of the regular portion of the tube 11 and the fraction f of the bending moment to be transferred.

While the transfer zone of the invention has been described in combination with a depression on the outer surface of a coupling, the transfer zone can be produced independently of the depression, in particular in the case of a connection which is termed an integral connection in which the male and female elements both form part of great length tubes.

Figure 11:
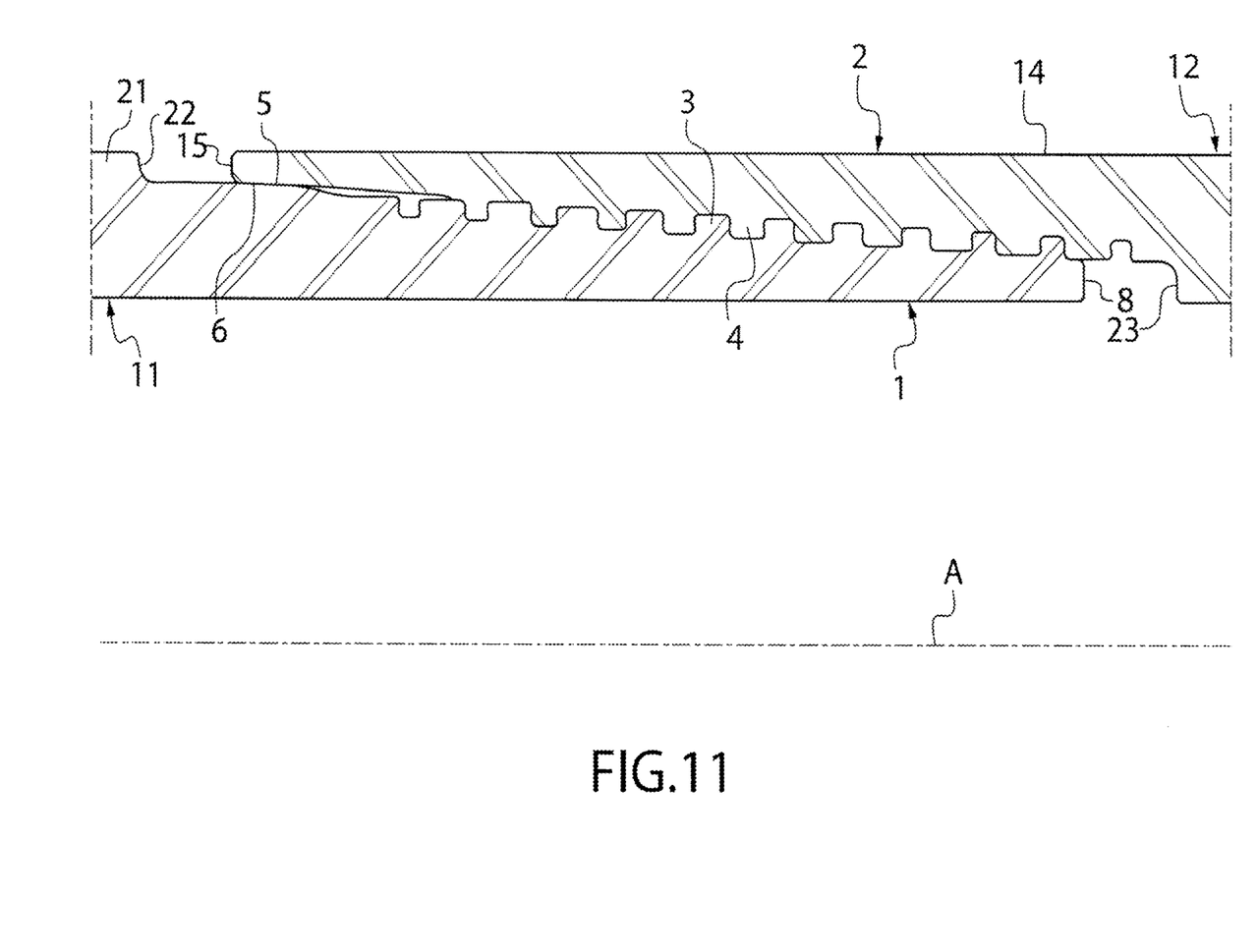
FIG. 11 is an axial half-sectional view of a threaded tubular connection featuring threads according to any one of FIGS. 5 to 10.

FIG. 11 is a partial sectional view through an axial plane of a threaded connection of the invention.

FIG. 11 discloses a male element 1 with a male (external) threading 3, a female element 2 with a female (internal) threading 4 and a transfer zone between the threadings 3, 4 and the free end 15 of the female element 2, said free end 15 being substantially radial. After make up, the free end 15 is distal from a shoulder 22 on a maximum diameter portion 21 of the male element 1. The male element 1 has a transfer surface 5 and the female element 2 has a transfer surface 6 in tight contact one with the other as in the previous embodiments. The transfer surface 5 comprises an undulated transfer surface. The transfer surface 6 comprises a smooth transfer surface. The transfer surface 6 may be frustoconical. The male element 1 has a free end 8. The free end 8 may be radially shaped. The free end 8 is located near the threading 3. The free end 8 is away from a shoulder 23 of the female element 2 after make up. The shoulder 23 is arranged between the threading 4 and a bore of the female element 2.

Alternately, the undulated transfer surface is provided on the female element and the smooth transfer surface on the male element.

The male element 1 and the female element 2 of the connection of FIG. 11 may be part of drill string components, for example drill pipe, heavy weight drill pipe, drill collars and/or drill string accessories or of work-over riser members. In particular, in the case of drill pipe or heavy weight drill pipe or of work-over riser, the male element and the female element may be pin and box tool-joints. The male and female threadings comprise self-locking threads such as those disclosed in documents U.S. RE30647, U.S. RE34467, WO2004/106797, the content of which is incorporated here by reference.

In self-locking threads, the male and female load flank leads are larger than the male and female stabbing flank leads, which has for consequence that the axial width of the threads of said threadings and the interval between said threads respectively progressively increase and decrease along the axis of the connection from the free end of the element towards the opposite end of the element.

The threads of each threading are then housed with an axial clearance in the intervals of the other threading at the start of make up, said clearance progressively decreasing during make up until it becomes zero at the end of make-up.

In the tightened (made-up) position of the threaded tubular connection, the load and stabbing flanks of the male threads are engaged in tight contact with the load and stabbing flanks of the female threads and prevent further threading.

Make up of the elements of FIG. 11 is not limited by and doesn't necessitate any axial abutment surface separate from the threads. There is no axial contact between the free end of each element and the other element.

Due to the developed surface of the thread flanks, self-locking threads can be tightened under a high torque and may undergo high compressive loads; they may be useful in applications necessitating high make-up torque such as drill pipe and other drill string components or such as work-over risers.

One drawback of the absence of separate abutment surfaces (stop shoulders) in connections with self locking threads is that the fatigue life is severely limited due to lack of support by abutment shoulder(s), all the bending loads being born by the threads.

The transfer surfaces 5, 6 in the connection of FIG. 11 allow transferring part of the bending loads and moments from one element to the other element away from the threads. The same calculations as disclosed hereabove can be used to design the features of the transfer zone.

Although not represented on FIG. 11, the external diameter of the female element may be locally reduced to form an annular depression similar to the one referenced 13 in FIG. 1. Calculations similar to those disclosed hereabove in the present document can be used to design the features of the depression, in particular the minimum outside diameter in the depression.

Figure 5:
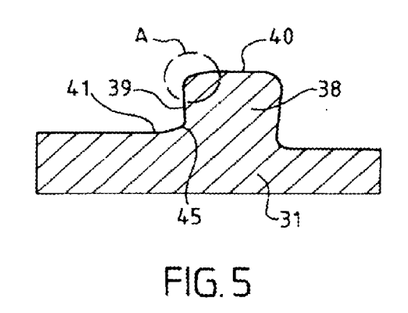
FIG. 5 is a partial axial cross sectional view that shows one thread of a connection of the invention.
Figure 5A:
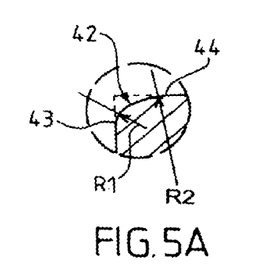
FIG. 5A shows detail A of FIG. 5 on a larger scale.

FIG. 5 is a partial sectional view through an axial plane of a male element of a threaded connection 31 of the invention, showing one self-locking thread 38 of said element. Thread 38 has, in known manner, a dovetail profile with thread crests and roots that are parallel to the axis of the threaded connection and thus straight. Further, the loading flank 39 of the thread 38 joins the thread crest 40 and the adjacent thread root 41 via respective rounded portions the first of which is shown on a larger scale in FIG. 5A. The profile of said rounded portion 42 is composed of two arcs of circles 43 and 44, arc 43 being tangential to the flank 39 and having a radius R1 in the range 0.1 to 0.2 mm, and arc 44 being tangential to arc 43 and to the thread crest 40 and having a radius R2 in the range 0.8 to 1.2 mm. Rounded portion 45 connecting the loading flank 39 to the thread root 41 is similar to rounded portion 42, the circular arc with the smaller radius also being adjacent to the flank 39. These rounded portions reduce the load concentration factor at the base of the loading flanks and thus improve the fatigue behaviour of said connection. Further details on such double radii rounded portions can be found in U.S. Pat. No. 6,729,658 which is incorporated by reference.

Figure 6:
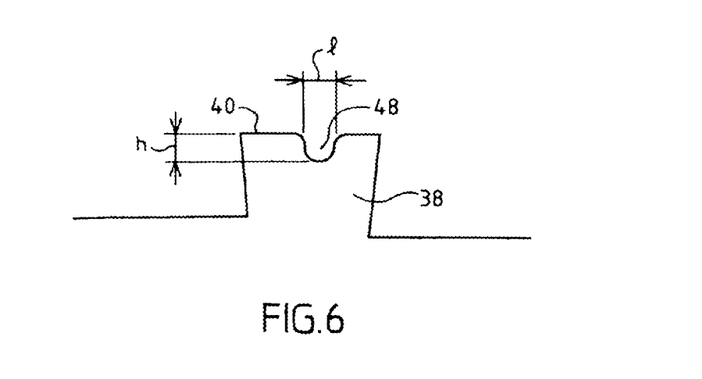
FIG. 6 is a partial axial cross sectional view that shows one thread of a connection of the invention.

FIG. 6 is a view analogous to FIG. 5, showing a groove 48 provided in the thread crest 40. Said groove has a width C and a depth h, and extends over the whole of the helical path of the male threading to an annular discharge groove 37 at the end of the threading or the threading portion to encourage evacuation of the grease used for lubrication during make up and as a result to release the pressure developed by said grease. Groove 48 also slightly increases the flexibility of the threads, rendering the relative axial position of the male and female elements less dependent on machining tolerances. In the example shown, groove 48 is connected to the thread crest via rounded portions. These can be replaced by chamfers.

Figure 9:
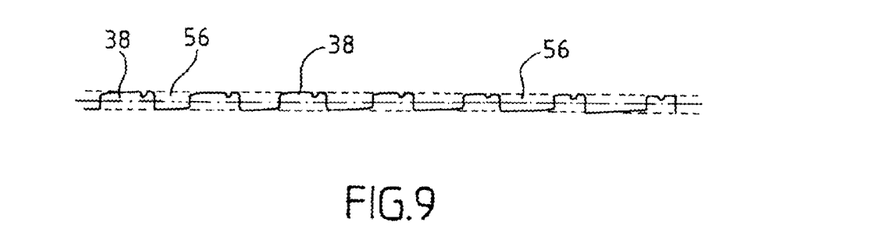
FIG. 9 shows a partial sectional view showing a few turns of the male threading of a connection of the invention, the axial width of the threads and that of the intervals between the threads increasing and decreasing respectively progressively from the free end of the male element.

Rounded portions similar to rounded portions 42 and 45 and/or a groove similar to groove 48 can be provided on the female element in addition to or to replace those of the male element. Further, while the rounded portions and the groove are shown separately in FIGS. 5 and 6, they can advantageously be used together, as shown in FIG. 9. It is also possible to connect the loading flank of the threads of the male element and/or the female element to only the thread crest or the root. The self-locking threadings employed in the embodiments can be of any non interfering type between thread crests and roots, or of the interfering type between thread crests and roots.

Figure 7:
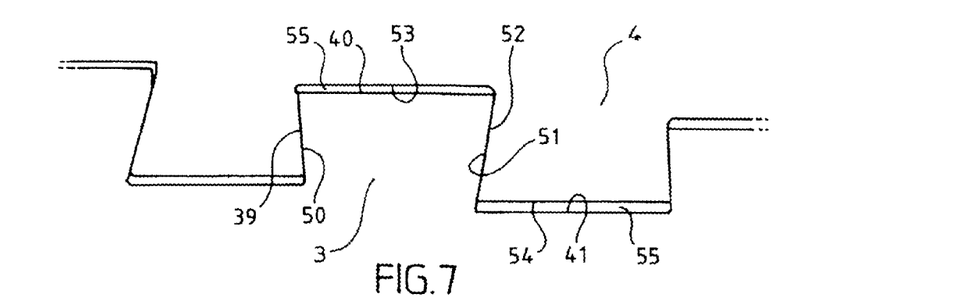
FIG. 7 illustrates a partial axial sectional view of a few turns of the male and female threadings of a connection of the invention in the made up position for non interfering threadings.

FIG. 7 shows a male threading 3 and a female threading 4 in the made up position in the case of non interfering self-locking threadings.

The male loading flanks 39 and female loading flanks 50 are in contact, as are the male stabbing flanks 51 and female stabbing flanks 52.

In contrast, there is a clearance between the male thread crest 40 and the female thread root 53 as well as between the female thread crest 54 and the male thread root 41.

Said function is obtained by causing the loading flanks and stabbing flanks to come into contact before any contact between the thread roots and crests.

It can be seen that by dint of said clearances, a substantial helical leakage channel 55 exists for gas but which may filled by compound grease (dope) making the connection to be tight to heavy liquids such as drilling muds.

Figure 8:
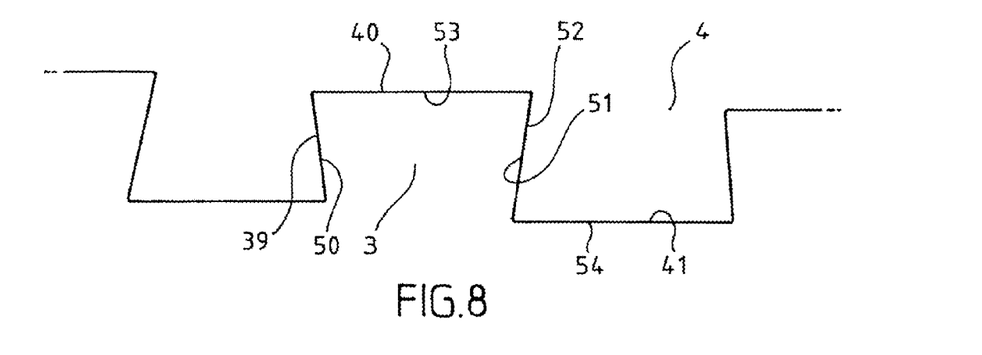
FIG. 8 shows a partial axial sectional views of a few turns of the male and female threadings of a connection of the invention in the made up position for interfering threadings.

FIG. 8 shows a male threading 3 and a female threading 4 in the made up position in the case of interfering threadings; the reference numbers used in FIG. 7 are used to designate similar elements.

The threadings are designed so that the female thread crests come into contact with the male thread roots and/or the male crests with the female thread roots during make up before contact of the loading flanks and the stabbing flanks.

After said contact between the thread crests and roots, make up can be continued until the loading and stabbing flanks come into contact; the thread crests will interfere with the corresponding thread roots.

A connection featuring such interfering threadings can be made tight to liquids such as drilling mud.

Figure 10:
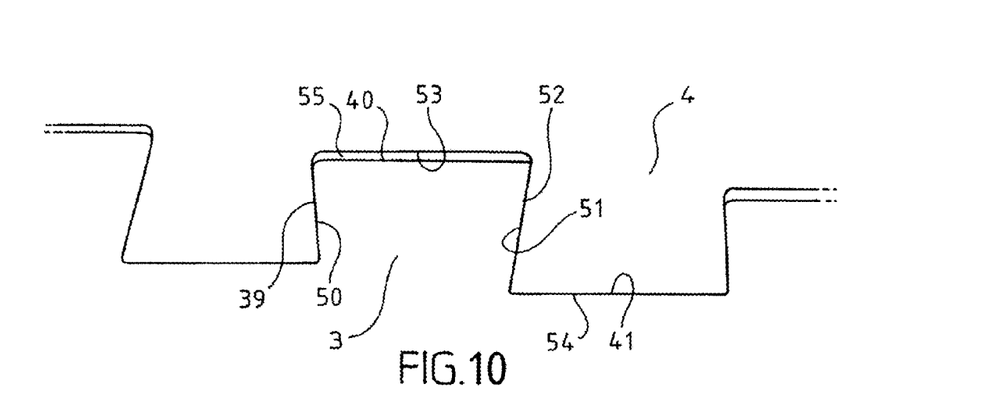
FIG. 10 shows a variation of FIGS. 7 and 8.

FIG. 10 is similar to FIGS. 7 and 8 and bears the same references as those do. FIG. 10 discloses the case of interfering threadings at the male thread roots 41 and at the female thread crests 54, a radial clearance existing between the female thread roots 53 and the male thread crests 40. One can provide for the reverse disposition, i.e. a clearance between the male thread roots 41 and the female thread crests 54 and an interference between the female thread roots 53 and the male thread crests 40.

By way of example, the embodiments of FIGS. 7 and 8 can be produced with male threads and female threads of a uniform height to 1.36 mm, and the embodiment of FIG. 10 by increasing the female thread height of 1.285 mm, the male thread height remaining unchanged, which leads to a radial clearance Z of 0.075 mm between male crests and female roots.

Such clearance may be filled by a compound dope to make the connection tight to liquids such as drilling mud.

FIG. 9 shows a few turns of the thread 38 of the male self-locking threading of a connection, separated from each other by a helical interval 56. It illustrates the progressive variation of the axial width of the thread 38 and that of the interval 56, respectively increasing and reducing from the free end of the male element, which causes progressive axial interference of the male and female threads during make up.

The presence of a groove 48 in the threads of FIGS. 6 and 9 may necessitate a separate seal if tightness is looked for.

Figure 12:
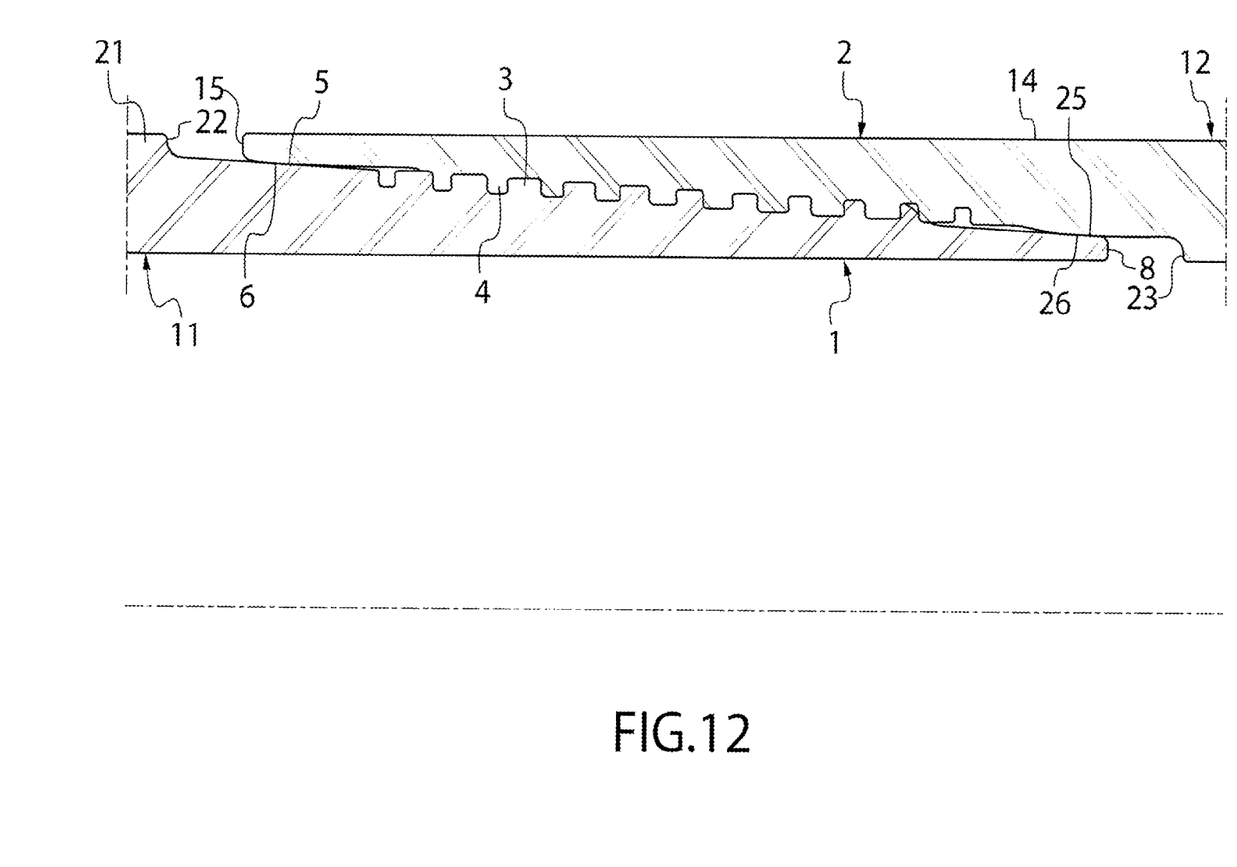
FIG. 12 is a variation of FIG. 11.

FIG. 12 shows a connection with self-locking threads similar to FIG. 11 except that it features a second or additional transfer zone having male and female transfer surfaces 25, 26 in tight contact, between the threading 3, 4 and the male free end 8. With regard to the embodiment of FIG. 11, the distance between the male free end 8 and the male threading 3 is increased to let an axial space for the male transfer surface 25. The distance between the female shoulder 23 and the female threading 4 is increased to let an axial space for the female transfer surface 26. The second or additional transfer surfaces 25, 26 (near the male free end) may exhibit the same features as the transfer surfaces 5, 6.

This embodiment is free of axial contact between the free end of each element and the other element.

In FIG. 12, the undulated transfer surface of the additional transfer zone (near the male free end) is provided on the male element and the corresponding smooth transfer surface on the female element (like for the first transfer zone near the female free end). Alternatively the undulated transfer surface of the additional transfer zone may be provided on the female element and the corresponding smooth transfer surface on the male element (contrarily to the first transfer zone near the female free end).

The additional transfer surfaces 25, 26 can be localized and designed with the same calculations as disclosed hereabove for the transfer surfaces 5, 6 near the female free end.

A connection with two transfer zones having such two pairs of transfer surfaces 5, 6, 25, 26 enables more bending load and bending moment transfer and is particularly beneficial when associated with self-locking threads.

The external diameter of the female element near the female free end may be locally reduced to form an annular depression opposite the first transfer zone, similar to the depression referenced 13 in FIG. 1. Calculations similar to those disclosed hereabove in the present document can be used to design the features of the depression, in particular the minimum outside diameter in the depression.

The internal diameter of the female element near the male free end may be locally increased opposite the additional transfer zone to form an annular depression similar to the one referenced 13 in FIG. 1, mutatis mutandis from the female element to the male element. Calculations similar to those disclosed hereabove in the present document can be used to design the features of the depression, in particular the maximum inside diameter in the depression.

In particular the depression near the male free end can have an axially extending concave curvilinear profile facing the additional transfer zone and either side thereof, the internal diameter being maximal substantially facing a median point of the additional transfer zone and decreasing progressively to either side of said point.

The maximum internal diameter is such that the bending inertia of the female element in the plane of the maximum diameter is at least equal to the product of the bending inertia $I_{zz}$ of the regular portion of the pipe at one end of which the female tubular element is formed and the fraction f of the bending moment to be transferred to the male element.

Although not illustrated it is also possible to design a threaded connection having self-locking threads with only one pair of transfer zones 25, 26 between the threadings and the male free end.

The undulated transfer surface of the transfer zone near the male free end is then provided on the male element and the corresponding smooth transfer surface on the female element. Alternatively the undulated transfer surface of the single transfer zone near the male free end may be provided on the female element and the corresponding smooth transfer surface on the male element.

The single pair of transfer surfaces near the male free end can be localized and designed with the same calculations as disclosed hereabove for the pair of transfer surfaces near the female free end.

The inner peripheral surface of the male element having a single pair of transfer surfaces near the male free end can have a depression which locally increases its internal diameter facing said transfer zone and which is similar to the one disclosed hereabove in the embodiment of the additional transfer zone.

Obviously, numerous modifications and variations of the present invention are possible in light of the above teachings. It is therefore to be understood that within the scope of the appended claims, the invention may be practiced otherwise than as specifically described herein.

The invention claimed is:

1. A threaded tubular connection for a tubular string that is subjected to dynamic bending loads, comprising:
    a male tubular element provided with a male threaded portion and a female tubular element provided with a female threaded portion, the male threaded portion and the female threaded portion each comprising self-locking threads having a crest, a load flank, a stabbing flank and a root, a load flank lead of the self-locking threads being larger than a stabbing flank lead of the self-locking threads such that in a tightened position of the threaded tubular connection, the load flanks and the stabbing flanks of the male self-locking threads are engaged in tight contact with the load flanks and the stabbing flanks of the female self-locking threads, and
    a transfer zone that is axially disposed between said threaded portions and a free end of at least one of said tubular elements, and that is axially spaced from said threaded portions, wherein a fraction of at least 20% of bending moment, to which the connection is subjected, is transferred from one of the male and female elements to the other,
    wherein the male and female elements include respective transfer surfaces in mutual contact with a radial interference fit in said transfer zone, at least one of the transfer surfaces being an undulated surface having a profile and defining a series of rounded annular ribs which come into interfering contact with the facing transfer surface, points of maximum diameter and minimum diameter of the profile being located on respective rounded portions of the profile, the free end of one of the tubular elements having a front surface free of contact with the other tubular element.

2. A threaded connection according to claim 1, wherein the transfer zone is made of a material having a yield strength and an axial length such that the transfer zone limits contact pressure resulting from transferring the bending moment to a fraction of the yield strength of the material.

3. A threaded connection according to claim 1, wherein said male and female transfer surfaces are lubricated.

4. A threaded connection according to claim 1, wherein said facing transfer surface is a smooth surface, the undulated surface being out of contact with the smooth surface between the ribs.

5. A threaded connection according to claim 1, wherein the ribs of the at least one of the transfer surfaces are housed between the ribs of the facing transfer surface.

6. A threaded connection according to claim 1, wherein the undulated surface has a periodic profile with undulations that periodically repeat over the undulated surface.

7. A threaded connection according to claim 6, wherein said periodic profile is asymmetric.

8. A threaded connection according to claim 7, wherein said asymmetric periodic profile forms part of the male transfer surface and is defined by a first convex rounded portion passing through a point with a maximum profile diameter, a second concave rounded portion passing through a point with a minimum profile diameter and which is tangential to the first rounded portion, and a third convex rounded portion which is tangential to the first and second rounded portions and which has a radius which is substantially larger than respective radii of the first and second rounded portions.

9. A threaded connection according to claim 8, wherein the second rounded portion has a larger radius than the first rounded portion.

10. A threaded connection according to claim 8, wherein starting from the free end of the male element, an axial distance between a maximum profile diameter point and a following minimum diameter point of the profile is less than an axial distance between the minimum profile diameter point and a following maximum diameter point of the profile.

11. A threaded connection according to claim 8, wherein the third rounded portion is located between a minimum profile diameter point and a following maximum diameter point of the profile.

12. A threaded connection according to claim 1, wherein said radial interference fit is substantially constant from one rib to the other.

13. A threaded connection according to claim 1, wherein the transfer surfaces are in mutual metal/metal sealing contact.

14. A threaded connection according to claim 1, wherein the male and female transfer surfaces form part of tapered surfaces.

15. A threaded connection according to claim 1, wherein said transfer zone is axially disposed between said threaded portions and the free end of the female element.

16. A threaded connection according to claim 15, wherein an outer peripheral surface of the female tubular element has a depression which locally reduces its external diameter facing the transfer zone near the female free end.

17. A threaded connection according to claim 16, wherein said depression has an axially extending concave curvilinear profile facing the transfer zone and either side thereof, said external diameter being minimal substantially facing a median point of the transfer zone and increasing progressively to either side of said point.

18. A threaded connection according to claim 17, wherein said minimum external diameter is such that the bending inertia of the female element in the plane of said minimum diameter is at least equal to the product of a bending inertia $I_{zz}$ of the regular portion of a pipe on which the male tubular element is formed and a fraction f of the bending moment to be transferred.

19. A threaded connection according to claim 17, wherein said concave curvilinear profile has a radius of curvature of at least 50 mm.

20. A threaded connection according to claim 1, comprising said transfer zone axially disposed between said threaded portions and the free end of the male element.

21. A threaded connection according to claim 20, wherein the inner surface of the male element has a depression which locally increases the internal diameter facing the transfer zone near the male free end.

22. A threaded connection according to claim 21, wherein said depression has an axially extending concave curvilinear profile facing the transfer zone and either side thereof, said internal diameter being maximal substantially facing a median point of the transfer zone and decreasing progressively to either side of said point.

23. A threaded connection according to claim 22, wherein said maximum internal diameter is such that the bending inertia of the male element in the plane of said maximum diameter is at least equal to the product of a bending inertia $I_{zz}$ of the regular portion of a pipe at one end of which the male tubular element is formed and a fraction f of the bending moment to be transferred.

24. A threaded connection according to claim 1, comprising said transfer zone axially disposed between said threaded portions and the free end of the female element and an additional transfer zone axially disposed between said threaded portions and the free end of the male element.

25. A threaded connection according to claim 1, wherein the self-locking threads have cylindrical crests.

26. A threaded tubular connection according to claim 1, wherein the male threaded portion and the female threaded portion interfere at the thread roots and crests over all or a portion of the male threaded portion and the female threaded portion.

27. A threaded tubular connection according to claim 1, wherein the male threaded portion and the female threaded portion interfere at the thread roots of a first threading and at the thread crests of a second threading over all or a portion of the threading length, whereas there is a radial clearance between the thread roots of a second threading and the thread crests of the first threading.

28. A threaded tubular connection according to claim 1, wherein the male threaded portion and the female threaded portion are non interfering at the thread roots and crests over all or a portion of the male threaded portion and the female threaded portion.

29. A threaded connection according to claim 1, wherein the male and female self-locking threads have a dovetail profile.

30. A threaded connection according to claim 1, wherein the load and stabbing flanks of the male and female self-locking threads make an angle with a normal to a connection axis which is negative and is 15 degrees or less.

31. A threaded connection according to claim 1, wherein, for the male self-locking threads and/or the female self-locking threads, the load flank joins the crest and/or the root via a rounded portion the profile of which is substantially formed by two arcs of circles tangential to each other, the adjacent to the load flank having a smaller radius of curvature than the other arc.

32. A threaded connection according to claim 31, wherein the radius of said other arc is in the range 0.8 to 1.2 mm.

33. A threaded connection according to claim 1, wherein the transfer zone comprises an undulated transfer surface on the male element and a smooth transfer surface on the female element.

34. A threaded connection according to claim 1, wherein the undulated transfer surface is provided on the female element and the smooth transfer surface on the male element.

35. A threaded connection according to claim 1, wherein an axial width of the threads of the male threaded portion and the threads of the female threaded portion and intervals between the threads varies progressively along an axis of connection over at least a portion of an axial length of the male threaded portion and the female threaded portion, the male threaded portion and the female threaded portion being configured such that the threads of each of the male threaded portions and the female threaded portion are housed with an axial clearance in the intervals of the other threads at a start of make up, the axial clearance progressively decreasing until the axial clearance becomes zero at an end of make up.

36. A threaded tubular connection according to claim 1, wherein an axial width of the threads of the male threaded portion and the threads of the female threaded portion and the intervals between the threads of the male threaded portion and the threads of the female threaded portion vary progressively over a whole of the axial length of the male threaded portion and the female threaded portion.

37. A threaded connection according to claim 1, wherein the male and female tubular elements are part of two made-up drill string components.

* * * * *

UNITED STATES PATENT AND TRADEMARK OFFICE
CERTIFICATE OF CORRECTION

| | | |
|---|---|---|
| PATENT NO. | : 8,220,842 B2 | Page 1 of 1 |
| APPLICATION NO. | : 12/650143 | |
| DATED | : July 17, 2012 | |
| INVENTOR(S) | : Gabriel Roussie et al. | |

It is certified that error appears in the above-identified patent and that said Letters Patent is hereby corrected as shown below:

Column 11, line 42, change "C" to --$\ell$--.

Signed and Sealed this
Twenty-third Day of October, 2012

David J. Kappos
*Director of the United States Patent and Trademark Office*